United States Patent
Wang et al.

(10) Patent No.: US 9,469,815 B2
(45) Date of Patent: Oct. 18, 2016

(54) PROCESS FOR CATALYTIC CRACKING A PYROLYSIS OIL

(71) Applicant: SHELL OIL COMPANY, Houston, TX (US)

(72) Inventors: Gang Wang, Beijing (CN); Jinsen Gao, Beijing (CN); Yantao Bi, Beijing (CN)

(73) Assignee: Shell Oil Company, Houston, TX (US)

(*) Notice: Subject to any disclaimer, the term of this patent is extended or adjusted under 35 U.S.C. 154(b) by 338 days.

(21) Appl. No.: 14/060,195

(22) Filed: Oct. 22, 2013

(65) Prior Publication Data

US 2014/0121428 A1 May 1, 2014

(30) Foreign Application Priority Data

Oct. 25, 2012 (CN) .......................... 2012 1 0413417

(51) Int. Cl.
*C10G 11/00* (2006.01)
*C10G 3/00* (2006.01)

(52) U.S. Cl.
CPC . *C10G 3/57* (2013.01); *C10G 3/42* (2013.01); *C10G 3/50* (2013.01); *C10G 11/00* (2013.01); *Y02P 30/20* (2015.11)

(58) Field of Classification Search
None
See application file for complete search history.

(56) References Cited

U.S. PATENT DOCUMENTS

| | | | |
|---|---|---|---|
| 4,876,108 A | 10/1989 | Underwood et al. | |
| 5,395,455 A | 3/1995 | Scott et al. | |
| 5,961,786 A | 10/1999 | Freel et al. | |
| 2006/0144757 A1* | 7/2006 | Steffens | B01F 5/20 208/113 |
| 2009/0253948 A1 | 10/2009 | McCall et al. | |
| 2012/0138698 A1* | 6/2012 | Wilson | B01J 4/002 239/1 |

FOREIGN PATENT DOCUMENTS

| | | | |
|---|---|---|---|
| CN | 201065397 | 5/2008 | |
| EP | 2325281 | 8/1987 | |
| NL | EP 2325281 A1 * | 5/2011 | ............... C10G 3/00 |

OTHER PUBLICATIONS

Wang H; "Effect of acid, alkali and steam explosion pretreatment on characteristics of bio-oil produced from pinewood"; Energy % Fuels; vol. 25; pp. 3758-31764; 2011.
Oasmaa et al; "Fast pyrolysis of Forestry Residue 1. Effet of extractives on phase separation of pyrolysis liquids"; Energy & Fuels; vol. 17, No. 1; pp. 1-12; 2003.
Wilson, Joseph; Handbook "Fluid Catalytic Cracking Technology and Operations"; Chapter 3; pp. 101-112; 1997.
Oasmaa et al; "Fast pyrolysis of Forestry Residue 1. Effect of extractives on phase separation of pyrolysis liquids"; Energy & Fuels; vol. 24; pp. 1380-1388; 2010.
Schoenmakers P.J. et al.; Journal of Chromatography. A; vol. 892; p. 29-46; 2000.
Venderbosch, R.H. et al., "Pyrolysis Oil Stabilisation by Catalytic Hydrotreatment", Biofuel's Engineering Process Tech., The Netherlands, 2011, Chapter 17, pp. 385-410, www.intechopen.com.
State Intellectual Property Office of the People's Republic of China, Notification of the First Office Action dated Oct. 30, 2015, Application No. 201380054271.9.

* cited by examiner

*Primary Examiner* — In Suk Bullock
*Assistant Examiner* — Philip Louie

(57) ABSTRACT

A process for catalytic cracking of a pyrolysis oil derived from material comprising biomass. In one embodiment, the process comprises subjecting a feed comprising the pyrolysis oil to a hydrodeoxygenation step to prepare an at least partially deoxygenated pyrolysis oil; heating a hydrocarbon feed to a temperature in the range from equal to or more than 50° C. to equal to or less than 200° C. to prepare a preheated hydrocarbon feed; mixing the at least partially deoxygenated pyrolysis oil and the preheated hydrocarbon feed to prepare a feed mixture; and contacting the feed mixture with a catalytic cracking catalyst in a catalytic cracking reactor at a temperature of at least 400° C. to prepare a product stream containing one or more cracked products.

11 Claims, 4 Drawing Sheets

PROCESS FOR CATALYTIC CRACKING A PYROLYSIS OIL

RELATED APPLICATIONS

This non-provisional application claims the benefit of Chinese Patent Application No. 201210413417.1, filed on Oct. 25, 2012, the disclosure of which is incorporated herein by reference in its entirety.

TECHNICAL FIELD

The present disclosure generally relates to a process for catalytic cracking of a pyrolysis oil, and more specifically to a process for catalytic cracking of a pyrolysis oil derived from a material comprising biomass.

BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of any prior art.

With the diminishing supply of petroleum crude oil, use of renewable energy sources is becoming increasingly important for the production of liquid fuels. These fuels from renewable energy sources are often referred to as biofuels.

Biofuels derived from non-edible renewable energy sources, such as cellulosic materials derived from plants, are preferred as these do not compete with food production. These biofuels are also referred to as second generation, renewable or advanced, biofuels.

One of the existing processes comprises pyrolysing such cellulosic materials derived from plants to obtain a pyrolysis oil, and upgrading and subsequently catalytic cracking of the pyrolysis oil to obtain chemicals and fuel products.

EP2325281 describes a process for catalytic cracking of a pyrolysis oil derived from material comprising lignocellulose, comprising the steps of a) subjecting a feed comprising the pyrolysis oil to a hydrodeoxygenation step to obtain a product stream comprising a partially deoxygenated pyrolysis oil; b) separating the partially deoxygenated pyrolysis oil having an oxygen content of from 5 to 30 wt % from the product stream obtained in a); c) contacting the partially deoxygenated pyrolysis oil obtained in b) in the presence of a hydrocarbon feed derived from a mineral crude oil with a cracking catalyst under catalytic cracking conditions to obtain a deoxygenated and cracked product stream; and d) separating at least one product fraction from the product stream obtained in c). EP2325281 further describes that the co-feeding in step c) may be attained by blending the partially deoxygenated pyrolysis oil and the hydrocarbon feed streams prior to the entry into a cracking unit, or alternately, by adding them at different stages.

However, in order to scale up the process of EP2325281 to a commercial scale, the process may require improvements to meet nowadays conversion, robustness, maintenance and/or safety requirements.

It would be an advancement in the art to provide a process allowing one to scale up a process for co-feeding of a partially or wholly deoxygenated pyrolysis oil and a hydrocarbon co-feed in a catalytic cracking unit to a commercial scale; and/or to provide a process allowing one to revamp existing commercial catalytic cracking units to allow for co-feeding of a partially or wholly deoxygenated pyrolysis oil and a hydrocarbon co-feed.

SUMMARY

Recently, it was found that when plain blending of a partially or wholly deoxygenated pyrolysis oil and a hydrocarbon feed and subsequently preheating this blend before entering a catalytic cracking unit, coke was formed in the feeding pipelines and/or nozzles. Such coking would decrease robustness of the process and would increase maintenance requirements. Surprisingly it was further found that the coking of feeding pipelines and/or nozzles could be reduced or even avoided by ensuring that the hydrocarbon feed was preheated to a temperature in the range from equal to or more than 50° C. to equal to or less than 200° C. before being blended with the partially or wholly deoxygenated pyrolysis oil.

In one embodiment, the present disclosure provides a process for catalytic cracking of a pyrolysis oil derived from material comprising biomass, comprising the steps of
a) subjecting a feed comprising the pyrolysis oil to a hydrodeoxygenation step to prepare an at least partially deoxygenated pyrolysis oil;
b) heating a hydrocarbon feed to a temperature in the range from equal to or more than 50° C. to equal to or less than 200° C. to prepare a preheated hydrocarbon feed;
c) mixing the at least partially deoxygenated pyrolysis oil and the preheated hydrocarbon feed to prepare a feed mixture;
d) optionally atomizing the feed mixture to prepare an atomized feed mixture; and
e) contacting the optionally atomized feed mixture with a catalytic cracking catalyst in a catalytic cracking reactor at a temperature of at least 400° C. to prepare a product stream containing one or more cracked products.

It was advantageously found that when using the process according to the present invention coking of the feeding pipelines and/or atomizing nozzles may be decreased or avoided.

Other advantages and features of embodiments of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Certain exemplary embodiments are illustrated by the following non-limiting figures.

DETAILED DESCRIPTION

Figure 1:
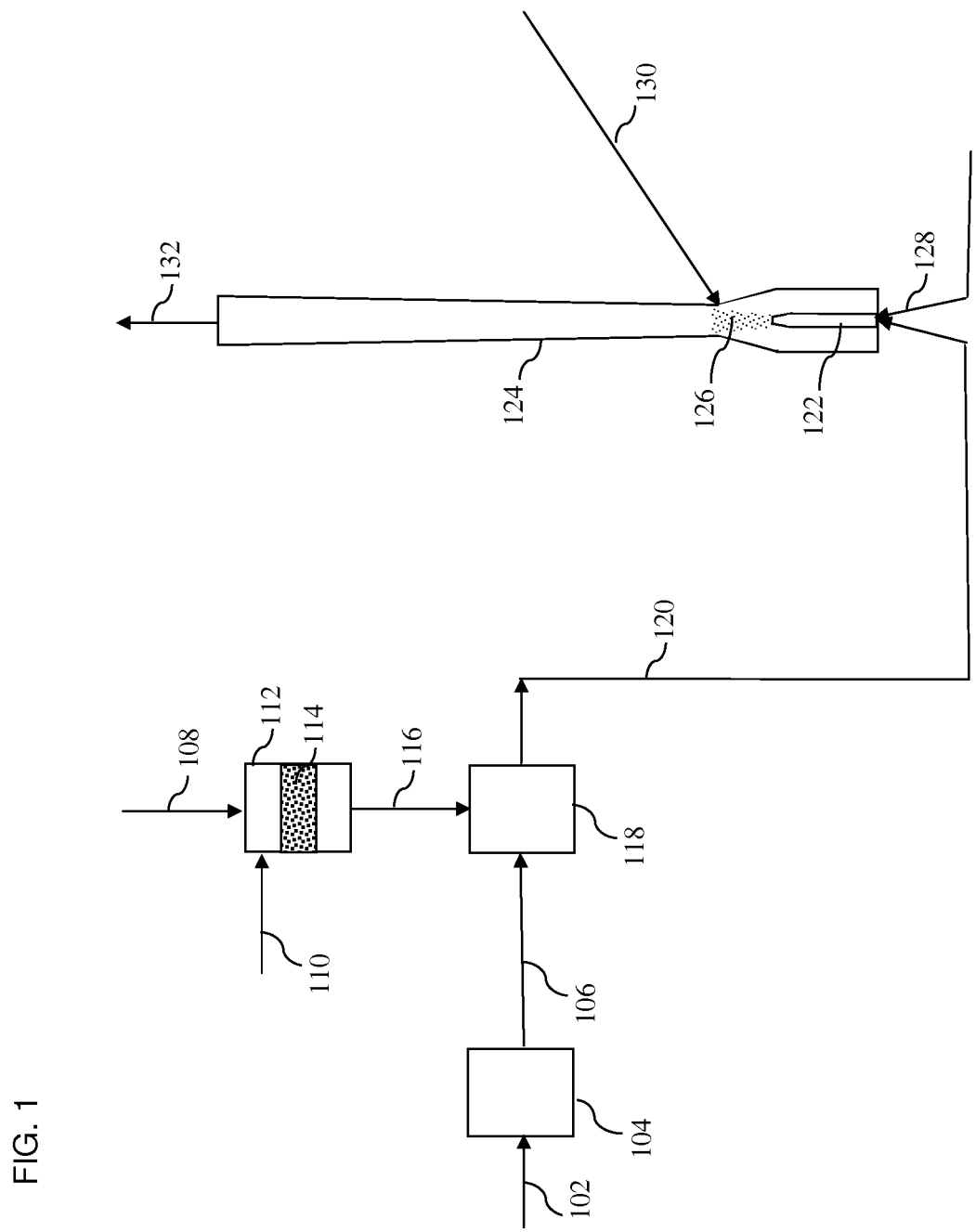
FIG. 1 shows a schematic diagram of a first process according to aspects of the invention.

The present disclosure relates to the catalytic cracking of a pyrolysis oil derived from material comprising biomass. In one embodiment, there is provided a process for catalytic cracking of a pyrolysis oil derived from material comprising biomass. The process comprises a) subjecting a feed comprising the pyrolysis oil to a hydrodeoxygenation step to prepare an at least partially deoxygenated pyrolysis oil; b) heating a hydrocarbon feed to a temperature in the range from equal to or more than 50° C. to equal to or less than 200° C. to prepare a preheated hydrocarbon feed; c) mixing the at least partially deoxygenated pyrolysis oil and the preheated hydrocarbon feed to prepare a feed mixture; d) optionally atomizing the feed mixture to prepare an atomized feed mixture; and e) contacting the optionally atomized feed mixture with a catalytic cracking catalyst in a catalytic cracking reactor at a temperature of at least 400° C. to prepare a product stream containing one or more cracked products.

By biomass is herein understood a composition of matter of biological origin as opposed to a composition of matter obtained or derived from petroleum, natural gas or coal. Without wishing to be bound by any kind of theory it is believed that such biomass may contain carbon-14 isotope in an abundance of about 0.0000000001%, based on total moles of carbon.

Preferably the biomass is a solid biomass material. More preferably the pyrolysis oil is a pyrolysis oil derived from a material containing cellulose and/or lignocellulose. Such a material containing "cellulose" respectively "lignocellulose" is herein also referred to as a "cellulosic," respectively "lignocellulosic" material. The term cellulosic material refers to a material containing cellulose and optionally also lignin and/or hemicellulose. The term lignocellulosic material refers to a material containing cellulose and lignin and optionally hemicellulose.

Examples of biomass include aquatic plants and algae, agricultural waste and/or forestry waste and/or paper waste and/or plant material obtained from domestic waste. Other examples of biomass can include animal fat, tallow oil and used cooking oil.

Preferably the pyrolysis oil is derived from a cellulosic or lignocellulosic material such as for example agricultural wastes such as corn stover, soybean stover, corn cobs, rice straw, rice hulls, oat hulls, corn fibre, cereal straws such as wheat, barley, rye and oat straw; grasses; forestry products and/or forestry residues such as wood and wood-related materials such as sawdust; waste paper; sugar processing residues such as bagasse and beet pulp; or mixtures thereof. More preferably the pyrolysis oil is derived from a cellulosic or lignocellulosic material selected from the group consisting of wood, sawdust, straw, grass, bagasse, corn stover and/or mixtures thereof.

In one embodiment, the cellulosic or lignocellulosic material may have undergone drying, demineralization, torrefaction, steam explosion, particle size reduction, densification and/or pelletization before being pyrolysed, to allow for improved process operability and economics.

The pyrolysis oil can suitably be produced by pyrolysing a material comprising a biomass. In a preferred embodiment, the process may further comprises a step preceding step a), which step comprises pyrolyzing a material comprising a biomass to produce a pyrolysis product.

The term pyrolysis or pyrolysing refers to the decomposition of the material comprising the biomass, in the presence or in the essential absence of a catalyst, at a temperature of equal to or more than 380° C.

In one embodiment, the concentration of oxygen is preferably less than the concentration required for complete combustion. Preferably pyrolysis is carried out in an oxygen-poor, preferably an oxygen-free, atmosphere. The term oxygen-poor atmosphere refers to an atmosphere containing equal to or less than 15 vol. % oxygen, preferably equal to or less than 10 vol. % oxygen and more preferably equal to or less than 5 vol. % oxygen. The term oxygen-free atmosphere refers to an atmosphere where oxygen is essentially absent. More preferably, pyrolysis is carried out in an atmosphere containing equal to or less than 5 vol. % oxygen, more preferably equal to or less than 1 vol. % oxygen and most preferably equal to or less than 0.1 vol. % oxygen. In a most preferred embodiment, pyrolysis is carried out in the essential absence of oxygen.

A material comprising the biomass is preferably pyrolysed at a pyrolysis temperature of equal to or more than 400° C., more preferably equal to or more than 450° C., even more preferably equal to or more than 500° C. and most preferably equal to or more than 550° C. The pyrolysis temperature is further preferably equal to or less than 800° C., more preferably equal to or less than 700° C. and most preferably equal to or less than 650° C.

The pyrolysis pressure may vary widely. For practical purposes a pressure in the range from 0.01 to 0.5 MPa (MegaPascal), more preferably in the range from 0.1 to 0.2 MPa is preferred. Most preferred is an atmospheric pressure (about 0.1 MPa).

In certain methods, chemicals may be employed for a pretreatment of the biomass, or catalysts may be added to the pyrolysis mixture, cf. for example, H Wang cs., "Effect of acid, alkali, and steam explosion pretreatment on characteristics of bio-oil produced from pinewood", Energy Fuels (2011) 25, p. 3758-3764. Preferably the pyrolysis does not include an externally added catalyst.

In a preferred pyrolysis process, generally referred to as a flash pyrolysis process, a biomass is rapidly heated (for example within 3 seconds) in the essential absence of oxygen to a temperature in the range of from 400° C. to 600° C. and kept at that temperature for a short period of time (for example equal to or less than 3 seconds). Such flash pyrolysis processes are known, for example from A. Oasmaa et al, "Fast pyrolysis of Forestry Residue 1: Effect of extractives on phase separation of pyrolysis liquids," Energy & Fuels, volume 17, number 1, 2003, pages 1-12; and A. Oasmaa et al, "Fast pyrolysis bio-oils from wood and agricultural residues," Energy & Fuels, 2010, vol. 24, pages 1380-1388; U.S. Pat. Nos. 4,876,108; 5,961,786; and 5,395,455.

During such pyrolysis of the material comprising the biomass a pyrolysis product is produced. The pyrolysis product may contain gas, solids (char), one or more oily phase(s), and optionally an aqueous phase. The oily phase(s) will hereafter be referred to as pyrolysis oil. The pyrolysis oil can be separated from the pyrolysis product by any method known by the skilled person to be suitable for that purpose. This includes conventional methods such as filtration, centrifugation, cyclone separation, extraction, membrane separation and/or phase separation.

The pyrolysis oil may include for example carbohydrates, olefins, paraffins, oxygenates and/or optionally some residual water. The term oxygenate refers to a compound containing at least one or more carbon atoms, one or more hydrogen atoms and one or more oxygen atoms. The oxygenates may, for example, include aldehydes, carboxylic acids, alkanols, phenols and ketones.

Preferably, the pyrolysis oil comprises carbon in an amount equal to or more than 25 wt %, more preferably equal to or more than 35 wt % and most preferably equal to or more than 40 wt %, and preferably equal to or less than 70 wt %, more preferably equal to or less than 60 wt %, based on the total weight of the pyrolysis oil.

The pyrolysis oil further preferably comprises hydrogen in an amount equal to or more than 1 wt %, more preferably equal to or more than 5 wt %, and preferably equal to or less than 15 wt %, more preferably equal to or less than 10 wt %, based on the total weight of the pyrolysis oil. (on a dry basis).

The pyrolysis oil further preferably comprises oxygen in an amount equal to or more than 25 wt %, more preferably equal to or more than 35 wt %, and preferably equal to or less than 70 wt %, more preferably equal to or less than 60 wt %, based on the total weight of the pyrolysis oil. Such oxygen content is preferably defined on a dry basis. By a dry basis is understood excluding water.

The pyrolysis oil may also contain nitrogen and/or sulphur. If nitrogen is present, the pyrolysis oil preferably comprises nitrogen in an amount equal to or more than 0.001 wt %, more preferably equal to or more than 0.1 wt %, and preferably equal to or less than 1.5 wt %, more preferably equal to or less than 0.5 wt %, based on the total weight of the pyrolysis oil.

If sulphur is present, the pyrolysis oil preferably comprises sulphur in an amount equal to or more than 0.001 wt %, more preferably equal to or more than 0.01 wt %, and preferably equal to or less than 1 wt %, more preferably equal to or less than 0.1 wt %, based on the total weight of the pyrolysis oil.

If present, the pyrolysis oil preferably comprises water in an amount equal to or more than 0.1 wt %, more preferably equal to or more than 1 wt %, still more preferably equal to or more than 5 wt %, and preferably equal to or less than 55 wt %, more preferably equal to or less than 45 wt %, and still more preferably equal to or less than 35 wt %, still more preferably equal to or less than 30 wt %, most preferably equal to or less than 25 wt %, based on the total weight of the pyrolysis oil.

Preferably, the Total acid number of the pyrolysis oil may be at most 250 mg KOH/g, more preferably in the range of from 5 mg KOH/g to 200 mg KOH/g, for example in the range of from 10 mg KOH/g to 150 mg KOH/g. As used herein, carbon content, hydrogen content and nitrogen content are as measured by ASTM D5291, and sulfur content is as measured by ASTM D2622. Oxygen content is calculated by difference, such that the sum of carbon content, hydrogen content, oxygen content, nitrogen content and sulfur content is 100 wt %. Water content is as measured by ASTM E203. As used herein, Total acid number is as measured by using ASTM D664.

The presence of water, oxygen-, nitrogen- and/or sulphur-containing compounds and the high Total acid number (TAN) makes the pyrolysis product less suitable for processing in a catalytic cracking unit.

In one embodiment, in step a), a feed comprising a pyrolysis oil is subjected to a hydrodeoxygenation step. In this hydrodeoxygenation step, a product is produced comprising an at least partially deoxygenated pyrolysis oil. This step may be further referred to as hydrodeoxygenation (HDO) reaction. By a hydrodeoxygenation is herein preferably understood reducing the concentration of oxygen-containing compounds with the help of hydrogen in the presence of a hydrodeoxygenation catalyst.

In one embodiment, the hydrodeoxygenation step preferably comprises contacting a feed comprising the pyrolysis oil with hydrogen in the presence of an hydrodeoxygenation catalyst at a temperature in the range from equal to or more than 200° C., more preferably equal to or more than 250° C., and most preferably equal to or more than 280° C., to equal to or less than 450° C., more preferably equal to or less than 400° C., and most preferably equal to or less than 350° C. Reference herein to the hydro-deoxygenation temperature is to the maximum temperature that is occurring in hydrodeoxygenation step (a). Since the hydro-deoxygenation reaction is an exothermic reaction, the temperature during the hydrodeoxygenation step may vary.

The total pressure during the hydrodeoxygenation step may vary, for example depending on the amount of water that may be present in the feed. Preferably, the total pressure during the hydrodeoxygenation step is in the range of from equal to or more than 1.0 MegaPascal, more preferably equal to or more than 5.0 MegaPascal to equal to or less than 35.0 MegaPascal, more preferably equal to or less than 30.0 MegaPascal. Preferably, the partial hydrogen pressure during the hydrodeoxygenation step is in the range of equal to or more than 0.2 MegaPascal, more preferably equal to or more than 2.0 MegaPascal to equal to or less than 35.0 MegaPascal, more preferably equal to or less than 30.0 MegaPascal.

The hydrodeoxygenation catalyst can be any type of hydrodeoxygenation catalyst known by the person skilled in the art to be suitable for this purpose. The hydrodeoxygenation catalyst preferably comprises one or more hydrodeoxygenation metal(s), preferably supported on a catalyst support. The catalyst support is preferably inert as a hydrodeoxygenation catalyst at the hydrodeoxygenation conditions. The one or more hydrodeoxygenation metal(s) are preferably chosen from Group VIII and/or Group VIB of the Periodic Table of Elements. The hydrodeoxygenation metal may for example be present as a mixture, alloy or organometallic compound. Preferably the one or more hydrodeoxygenation metal(s) is/are chosen from the group consisting of Nickel (Ni), Chromium (Cr), Molybdenum (Mo), Tungsten (W), Cobalt (Co), Platinum (Pt), Palladium (Pd), Rhodium (Rh), Ruthenium (Ru), Iridium (Ir), Osmium (Os), Copper (Cu), iron (Fe), Zink (Zn), Gallium (Ga), Indium (In), Vanadium (V) and mixtures thereof. The one or more metal(s) may be present in elementary form; in the form of alloys or mixtures; and/or in the form of oxides, sulfides or other metal-organic compounds. Preferably the hydrodeoxygenation catalyst is a catalyst comprising Tungsten, Ruthenium, Rhenium, Cobalt, Nickel, Copper, Molybdenum, alloys thereof and/or any combination thereof.

If the hydrodeoxygenation catalyst comprises a catalyst support, such catalyst support may be shaped in the form of balls, rings or otherwise shaped extrudates. The catalyst support may comprise a refractory oxide or mixtures thereof, preferably alumina, amorphous silica-alumina, titania, silica, ceria, zirconia; or it may comprise an inert component such as carbon or silicon carbide. The catalyst support may further comprise a zeolitic compound such as for example zeolite Y, zeolite beta, ZSM-5, ZSM-12, ZSM-22, ZSM-23, ZSM-48, SAPO-11, SAPO-41, and ferrierite.

Examples of suitable catalysts include $Rh/SiO_2$; $RhCo/Al_2O_3$; $Rh/CoSiO_3$; $RhCo/SiO_2$; $Co/SiO_2$; $Rh/ZrO_2$; $Rh/CeO_2$; $Ni/SiO_2$; $Ni/Cr_2O_3$; $Ni/Al_2O_3$; $Ni/ZrO_2$; $Ni-Cu/Al_2O_3$; $Ni-Cu/ZrO_2$; $Ni-Cu/CeO_2$; $Ni-Mo/Al_2O_3$; $Ni-Mo/ZrO_2$; $Co-Mo/Al_2O_3$ and $Co-Mo/ZrO_2$. Preferably the catalyst is chosen from the group consisting of $Rh/Al_2O_3$, $RhCo/Al_2O_3$; $Rh/ZrO_2$; $Rh/CeO_2$; $Ni/Cr_2O_3$; $Ni/Al_2O_3$; $Ni/ZrO_2$; $Ni-Cu/Al_2O_3$, $NiW/Al2O3$; $Ni-Cu/ZrO_2$; $Ru/C$; $Ni-Cu/CeO_2$; $Ni-Mo/Al_2O_3$; $Ni-Mo/ZrO_2$; $Co-Mo/Al_2O_3$; $Co-Mo/ZrO_2$ and/or mixtures thereof.

Most preferred are hydrodeoxygenation catalysts comprising Rhodium on alumina($Rh/Al_2O_3$), Rhodium-Cobalt on alumina (RhCo/Al$_2$O$_3$), Nickel-Copper on alumina (NiCu/Al$_2$O$_3$), Nickel-Tungsten on alumina (NiW/Al$_2$O$_3$), Cobalt-Molybdenum on alumina(CoMo/Al$_2$O$_3$) or Nickel-Molybdenum on alumina (NiMo/Al$_2$O$_3$).

In addition to the hydrodeoxygenation, step a) may comprise further steps, if so desired or necessary. For example, if desired, step a) may further comprise hydrodesulphurization and/or hydrodenitrogenation of the feed comprising the pyrolysis oil. Hydrodesulphurization may reduce the concentration of any sulphur-containing hydrocarbons. Hydrodenitrogenation may reduce the concentration of any nitrogen-containing hydrocarbons. Such hydrodesulphurization and/or hydrodenitrogenation, may be carried out before, after and/or simultaneously with the hydrodeoxygenation.

The hydrodeoxygenation can be carried out in any type of reactor known by the skilled person in the art to be suitable for a hydrodeoxygenation process. Preferably a fixed bed reactor, trickle flow reactor, ebullated bed reactor or fluidized bed reactor is used. In a preferred embodiment a weight hourly space velocity is used that is equal to or more than 0.2 and equal to or less than 4.0 kg/liter hour. The feed comprising the pyrolysis oil and the hydrogen can be contacted in any manner known by the skilled person in the art to be suitable. Preferably the feed comprising the pyrolysis oil is contacted with the hydrogen in a co-current or counter-current manner.

In one embodiment, in step a), a hydrodeoxygenation product is obtained comprising an at least partially deoxygenated pyrolysis oil. This product may contain a gaseous phase, solids, one or more oily phase(s), and optionally an aqueous phase. In a preferred embodiment, step a) further comprises separating the at least partially deoxygenated pyrolysis oil from any gas phase, solids and/or aqueous phase. Such separation may conveniently be carried out after cooling. Depending on the process conditions, the product of step a) may form two or more phases upon cooling. Preferably gaseous products are separated from a total liquid product, which total liquid product is preferably separated into an aqueous phase comprising water soluble compounds, and at least one organic phase comprising the at least partially (hydro-) deoxygenated pyrolysis oil. Any solids may for example be removed by means of filtering.

The pyrolysis oil may have been partially or wholly deoxygenated. The oxygen content (on dry basis) of the one or more organic phases, hereinafter referred to as the at least partially deoxygenated pyrolysis oil, preferably lies in the range from equal to or more than 0.0 wt %, more preferably equal to or more than 0.5 wt %, still more preferably equal to or more than 5 wt % and most preferably equal to or more than 8 wt % to equal to or less than 30 wt %, more preferably equal to or less than 20 wt % and most preferably equal to or less than 15 wt % (on dry basis) of the total weight of the one or more organic phases.

In one embodiment, in step b), a hydrocarbon feed is heated to a temperature in the range from equal to or more than 50° C. to equal to or less than 200° C. to prepare a preheated hydrocarbon feed. By a hydrocarbon feed is herein understood a feed that contains one or more hydrocarbon compounds. By a hydrocarbon compound is herein preferably understood a compound that consists of hydrogen and carbon. Examples of hydrocarbon compounds include paraffins (including naphthenes), olefins and aromatics.

The hydrocarbon feed can be any hydrocarbon feed known to the skilled person to be suitable as a feed for a catalytic cracking unit. The hydrocarbon feed can for example be derived from a conventional crude oil (also sometimes referred to as a petroleum oil or mineral oil), an unconventional crude oil (that is, oil produced or extracted using techniques other than the traditional oil well method) or a Fisher Tropsch oil (sometimes also referred to as a synthetic oil) and/or a mixture of any of these.

Preferably, the hydrocarbon feed comprises a hydrocarbon feed that is partly or wholly derived from a petroleum crude oil. More preferably, the hydrocarbon feed is an essentially completely petroleum-derived hydrocarbon feed, as opposed to a biomass-derived hydrocarbon feed. Examples of conventional crude oils (also called petroleum crude oils) include West Texas Intermediate crude oil, Brent crude oil, Dubai-Oman crude oil, Arabian Light crude oil, Midway Sunset crude oil or Tapis crude oil.

More preferably, the hydrocarbon feed comprises a fraction of a petroleum crude oil, unconventional crude oil or synthetic crude oil. Preferred fractions include straight run (atmospheric) gas oils, flashed distillate, vacuum gas oils (VGO), coker gas oils, diesel, gasoline, kerosene, naphtha, liquefied petroleum gases, atmospheric residue ("long residue") and vacuum residue ("short residue") and/or mixtures thereof. Most preferably the hydrocarbon feed comprises an atmospheric residue, vacuum residue and/or a vacuum gas oil.

In one embodiment the hydrocarbon feed preferably has a 5 wt % boiling point at a pressure of 0.1 MegaPascal, as measured by means of distillation as based on ASTM D86 titled "Standard Test Method for Distillation of Petroleum Products at Atmospheric Pressure," respectively as measured by ASTM D1160 titled "Standard Test Method for Distillation of Petroleum Products at Reduced Pressure," of equal to or more than 100° C., more preferably equal to or more than 150° C. An example of such a hydrocarbon feed is a vacuum gas oil.

In another embodiment, the hydrocarbon feed preferably has a 5 wt % boiling point at a pressure of 0.1 MegaPascal, as measured by means of distillation based on ASTM D86 titled "Standard Test Method for Distillation of Petroleum Products at Atmospheric Pressure," respectively as measured by ASTM D1160 titled "Standard Test Method for Distillation of Petroleum Products at Reduced Pressure," of equal to or more than 200° C., more preferably equal to or more than 220° C., most preferably equal to or more than 240° C. An example of such a hydrocarbon feed is long residue.

In a further preferred embodiment, equal to or more than 70 wt %, preferably equal to or more than 80 wt %, more preferably equal to or more than 90 wt % and still more preferably equal to or more than 95 wt % of the hydrocarbon feed boils in the range from equal to or more than 150° C. to equal to or less than 600° C. at a pressure of 0.1 MegaPascal, as measured by means of a distillation by ASTM D86 titled "Standard Test Method for Distillation of Petroleum Products at Atmospheric Pressure," respectively as measured by ASTM D1160 titled "Standard Test Method for Distillation of Petroleum Products at Reduced Pressure".

The composition of the hydrocarbon feed may vary widely. Preferably, the hydrocarbon feed comprises in the range from equal to or more than 50 wt %, more preferably from equal to or more than 75 wt %, and most preferably from equal to or more than 90 wt % to equal to or less than 100 wt % of compounds consisting only of carbon and hydrogen, based on the total weight of the hydrocarbon feed.

In one preferred embodiment, the hydrocarbon feed comprises equal to or more than 1 wt % paraffins, more preferably equal to or more than 5 wt % paraffins, and most preferably equal to or more than 10 wt % paraffins, and preferably equal to or less than 100 wt % paraffins, more preferably equal to or less than 90 wt % paraffins, and most preferably equal to or less than 30 wt % paraffins, based on the total hydrocarbon feed. By paraffins all of normal-, cyclo- and branched-paraffins are understood. For practical purposes the paraffin content of all hydrocarbon feeds having an initial boiling point of at least 260° C. can be measured by means of ASTM method D2007-03 titled "Standard test method for characteristic groups in rubber extender and processing oils and other petroleum-derived oils by clay-gel absorption chromatographic method," wherein the amount of saturates will be representative for the paraffin content. For all other hydrocarbon feeds the paraffin content of the hydrocarbon feed can be measured by means of comprehensive multi-dimensional gas chromatography (GC×GC), as described in P. J. Schoenmakers, J. L. M. M. Oomen, J. Blomberg, W. Genuit, G. van Velzen, J. Chromatogr. A, 892 (2000) p. 29 and further.

In one embodiment, in step b), the hydrocarbon feed is heated to a temperature in the range from equal to or more than 50° C. to equal to or less than 200° C. to prepare a preheated hydrocarbon feed. Preferably, the hydrocarbon feed is heated to a temperature of equal to or more than 60° C., more preferably of equal to or more than 70° C., and even more preferably to a temperature of equal to or more than 90° C. Preferably the hydrocarbon feed is heated to a temperature of equal to or less than 180° C., more preferably equal to or less than 140° C., even more preferably equal to or less than 130° C. and most preferably equal to or less than 120° C. Preferably the preheated hydrocarbon feed is in the liquid state, gaseous state or partially liquid—partially gaseous state.

Heating of the hydrocarbon feed can be carried out in any manner known by the person skilled in the art to be suitable therefore. For example, the hydrocarbon feed may be heated in one or more heat exchangers and/or one or more fired heaters. In such one or more heat exchangers the hydrocarbon feed may be heated with heat originating from one or more product streams, for example product streams generated elsewhere in a refinery, and/or steam or superheated steam. An example of a fired heater is a heating furnace. In a preferred embodiment, the hydrocarbon feed is first preheated via exchange with for example a hot product stream produced in the catalytic cracking reactor, whereafter the hydrocarbon feed is further preheated in a fired heater, such as a heating furnace.

In one embodiment, in step c), the at least partially deoxygenated pyrolysis oil is mixed with the preheated hydrocarbon feed to prepare a feed mixture. If so desired, also the at least partially deoxygenated pyrolysis oil may be preheated before mixing it with the preheated hydrocarbon feed. For example, the at least partially deoxygenated pyrolysis oil may be preheated to a temperature in the range from equal to or more than 30° C. to equal to or less than 100° C., more preferably to a temperature in the range from equal to or more than 30° C. to equal to or less than 80° C. The at least partially deoxygenated pyrolysis oil may be preheated in a similar fashion as the hydrocarbon feed, preferably however, the at least partially deoxygenated pyrolysis oil is only heated via one or more heat exchangers and not in any fired heater. For example the at least partially deoxygenated pyrolysis oil may be preheated via heat exchange with superheated steam.

The feed mixture of the at least partially deoxygenated pyrolysis oil and the preheated hydrocarbon feed can be produced in any manner known to the skilled person in the art. The at least partially deoxygenated pyrolysis oil may be added to the preheated hydrocarbon feed, or the preheated hydrocarbon feed may be added to at least partially deoxygenated pyrolysis oil, or streams of the at least partially deoxygenated pyrolysis oil and the preheated hydrocarbon feed may be brought together. The mixing may for example be carried out by in-line mixing, for example with the help of one or more baffles; in a mixer, for example equipped with a stirrer; or by just combining a stream of at least partially deoxygenated pyrolysis oil and a stream of preheated hydrocarbon feed in one pipeline or in a feed nozzle. Optionally, step c) may comprise mixing the at least partially deoxygenated pyrolysis oil and the preheated hydrocarbon feed in a feed nozzle, preferably a feed nozzle as described herein below. Most preferably, however, the at least partially deoxygenated pyrolysis oil and the preheated hydrocarbon feed are mixed before entering any feed nozzle.

Preferably, the at least partially deoxygenated pyrolysis oil and the preheated hydrocarbon feed may be combined in a weight ratio of at least partially deoxygenated pyrolysis oil (DOPO) to preheated hydrocarbon feed (PHF) (in grams DOPO/grams PHF) of at least 0.5/99.5, more preferably at least 1/99, still more preferably at least 2/98, respectively. Preferably, the at least partially deoxygenated pyrolysis oil and the preheated hydrocarbon feed may be combined in a weight ratio of at least partially deoxygenated pyrolysis oil (DOPO) to preheated hydrocarbon feed (PHF) (in grams DOPO/grams PHF) of at most 75/25, more preferably at most 50/50, even more preferably at most 20/80, and most preferably at most 15/85 respectively.

The amount of partially deoxygenated pyrolysis oil (DOPO), based on the total weight of feed mixture, is preferably equal to or less than 30 wt %, more preferably equal to or less than 20 wt %, most preferably equal to or less than 10 wt % and even more preferably equal to or less than 5 wt %. For practical purposes the amount of partially deoxygenated pyrolysis oil (DOPO), based on the total weight of feed mixture is preferably equal to or more than 0.1 wt %, more preferably equal to or more than 1 wt %.

In one embodiment, the process further comprises optional step d), where the feed mixture is atomized to prepare an atomized feed mixture. By atomizing is herein preferably understood the making of a dispersion of liquid droplets in a gas. Preferably the liquid droplets have an average diameter in the range from equal to or more than 20 micrometer to equal to or less than 60 micrometer.

In a preferred embodiment, the feed mixture may be atomized in a feed nozzle. In such a feed nozzle the feed mixture may conveniently be atomized by applying shear energy.

The feed nozzle may be any feed nozzle known to be suitable by the person skilled in the art. Preferably the feed nozzle is a bottom entry feed nozzle or a side entry feed nozzle. By a bottom entry feed nozzle is herein preferably understood a feed nozzle protruding the catalytic cracking reactor via the bottom. By a side entry feed nozzle is herein preferably understood a feed nozzle protruding the catalytic cracking reactor via a side wall.

In one embodiment, in step e), the feed mixture that is optionally atomized is contacted with a catalytic cracking catalyst in a catalytic cracking reactor at a temperature of at least 400° C. to prepare a product stream containing one or more cracked products. Preferably, the optionally atomized feed mixture is contacted with the catalytic cracking catalyst in a catalytic cracking reactor. By a catalytic cracking reactor is herein understood a reactor suitable for carrying out a catalytic cracking reaction. Examples of such a catalytic cracking reactor include a fixed bed reactor, ebullated bed or slurry reactor. Preferably the catalytic cracking reactor is a fluid catalytic cracking reactor. Most preferably, the catalytic cracking reactor is a so-called riser reactor.

In a preferred embodiment, the process provides for fluid catalytic cracking of the pyrolysis oil and the catalytic cracking catalyst in step e) is a fluid catalytic cracking catalyst. In this preferred embodiment, the optionally atomized feed mixture is contacted with a fluid catalytic cracking catalyst in a fluid catalytic cracking reactor at a temperature of at least 400° C. to prepare a product stream containing one or more cracked products. Preferably the fluid catalytic cracking reactor is a riser reactor. Preferably the fluid catalytic cracking catalyst flows from the bottom of the riser reactor upwards to the top of the riser reactor. Preferably the riser reactor is part of a catalytic cracking unit (i.e. as a catalytic cracking reactor), more preferably a fluidized catalytic cracking (FCC) unit.

Examples of suitable riser reactors are described in the Handbook titled "Fluid Catalytic Cracking technology and operations", by Joseph W. Wilson, published by PennWell Publishing Company (1997), chapter 3, especially pages 101 to 112, herein incorporated by reference. For example, the riser reactor may be a so-called internal riser reactor or a so-called external riser reactor as described therein.

Preferably, the feed mixture is fed into the catalytic cracking reactor via one or more feed nozzles. When the process is a fluid catalytic cracking process and the catalytic cracking reactor is a fluid catalytic cracking reactor, preferably a riser reactor, the feed mixture may for example be fed into the fluid catalytic cracking reactor via a bottom entry feed nozzle or one or more side entry feed nozzles. Most preferably the feed mixture is fed to a riser reactor via a bottom feed nozzle. By a bottom feed nozzle is herein understood a feed nozzle located at the most upstream part of a riser reactor.

Most preferably, in one embodiment, there is provided a process for fluid catalytic cracking of a pyrolysis oil derived from material comprising lignocellulose. The process comprises a) subjecting a feed comprising the pyrolysis oil to a hydrodeoxygenation step to prepare an at least partially deoxygenated pyrolysis oil; b) heating a hydrocarbon feed to a temperature in the range from equal to or more than 50° C. to equal to or less than 200° C. to prepare a preheated hydrocarbon feed; c) mixing the at least partially deoxygenated pyrolysis oil and the preheated hydrocarbon feed to prepare a feed mixture; d) optionally atomizing the feed mixture to prepare an atomized feed mixture; and e) contacting the, optionally atomized, feed mixture with a fluid catalytic cracking catalyst in a riser reactor at a temperature of at least 400° C. to prepare a product stream containing one or more cracked products.

Preferences for such a process are as described herein before for the catalytic cracking process. It may be advantageous to also add a lift gas at the bottom section of the riser reactor. Examples of such a liftgas include steam, nitrogen, vaporized oil and/or oil fractions, vaporized sour water and mixtures thereof. Steam is most preferred as a lift gas from a practical perspective. In a preferred embodiment, such liftgas and the feed mixture may be mixed in a feed nozzle as described hereinbefore.

Preferably, in one embodiment, the temperature in step e), that is the temperature at which the feed mixture and the catalytic cracking catalyst are contacted, ranges from equal to or more than 450° C., more preferably from equal to or more than 480° C., most preferably from equal to or more than 500° C., to equal to or less than 800° C., more preferably equal to or less than 750° C., most preferably equal to or less than 680° C. If the temperature varies throughout the catalytic cracking reactor, the highest temperature in any catalytic cracking reactor is intended. Preferably the pressure in step e), that is the temperature at which the feed mixture and the catalytic cracking catalyst are contacted, ranges from equal to or more than 0.05 MegaPascal to equal to or less than 1.0 MegaPascal, more preferably from equal to or more than 0.1 MegaPascal to equal to or less than 0.6 MegaPascal.

If step e) is carried out in a riser reactor, the total average residence time of the feed mixture preferably lies in the range from equal to or more than 1 second, more preferably equal to or more than 1.5 seconds and even more preferably equal to or more than 2 seconds to equal to or less than 10 seconds, preferably equal to or less than 5 seconds and more preferably equal to or less than 4 seconds. Residence time as referred to in this patent application is based on the vapour residence at outlet conditions, that is, residence time includes not only the residence time of a specified feed (such as an atomized feed mixture) but also the residence time of its conversion products.

In one embodiment, step e) may further comprise supplying of an additional hydrocarbon co-feed to the catalytic cracking reactor separately from the hydrocarbon feed present in the feed mixture. Such a hydrocarbon co-feed can be the same or different as the hydrocarbon feed described herein above. Preference for such a hydrocarbon co-feed is described above for the hydrocarbon feed.

The weight ratio of catalyst to feed (that is the total feed of feed mixture and any optional additional feed)—herein also referred to as catalyst:feed ratio—preferably lies in the range from equal to or more than 1:1, more preferably from equal to or more than 2:1 and most preferably from equal to or more than 3:1 to equal to or less than 150:1, more preferably to equal to or less than 100:1, most preferably to equal to or less than 50:1.

The catalytic cracking catalyst can be any catalyst known to the skilled person to be suitable for use in a cracking process. Preferably, the catalytic cracking catalyst comprises a zeolitic component. In addition, the catalytic cracking catalyst can contain an amorphous binder compound and/or a filler. Examples of the amorphous binder component include silica, alumina, titania, zirconia and magnesium oxide, or combinations of two or more of them. Examples of fillers include clays (such as kaolin).

The zeolite is preferably a large pore zeolite. The large pore zeolite includes a zeolite comprising a porous, crystalline aluminosilicate structure having a porous internal cell structure on which the major axis of the pores is in the range of 0.62 nanometer to 0.8 nanometer. The axes of zeolites are depicted in the 'Atlas of Zeolite Structure Types', of W. M. Meier, D. H. Olson, and Ch. Baerlocher, Fourth Revised Edition 1996, Elsevier, ISBN 0-444-10015-6. Examples of such large pore zeolites include FAU or faujasite, preferably synthetic faujasite, for example, zeolite Y or X, ultra-stable zeolite Y (USY), Rare Earth zeolite Y (=REY) and Rare Earth USY (REUSY). According to the present invention USY is preferably used as the large pore zeolite.

The catalytic cracking catalyst can also comprise a medium pore zeolite. The medium pore zeolite that can be used according to the present invention is a zeolite comprising a porous, crystalline aluminosilicate structure having a porous internal cell structure on which the major axis of the pores is in the range of 0.45 nanometer to 0.62 nanometer. Examples of such medium pore zeolites are of the MEI structural type, for example, ZSM-5; the MTW type, for example, ZSM-12; the TON structural type, for example, theta one; and the FER structural type, for example, ferrierite. According to the present invention, ZSM-5 is preferably used as the medium pore zeolite.

According to another embodiment, a blend of large pore and medium pore zeolites may be used. The ratio of the large pore zeolite to the medium pore size zeolite in the cracking catalyst is preferably in the range of 99:1 to 70:30, more preferably in the range of 98:2 to 85:15.

The total amount of the large pore size zeolite and/or medium pore zeolite that is present in the cracking catalyst is preferably in the range of 5 wt % to 40 wt %, more preferably in the range of 10 wt % to 30 wt %, and even more preferably in the range of 10 wt % to 25 wt % relative to the total mass of the catalytic cracking catalyst.

Preferably, the catalytic cracking catalyst is contacted in a cocurrent-flow, with the feed mixture. Preferably the catalytic cracking catalyst is separated from the one or more cracked products after use; regenerated in a regenerator; and reused in the catalytic cracking reactor.

In a preferred embodiment, the process comprises a step e) comprising a catalytic cracking step comprising contacting the feed mixture, and optionally any additional hydrocarbon feed, with a fluid catalytic cracking catalyst at a temperature of more than 400° C. in a riser reactor to produce one or more cracked products and a spent catalytic cracking catalyst; a separation step comprising separating the one or more cracked products from the spent catalytic cracking catalyst; a regeneration step comprising regenerating spent catalytic cracking catalyst to produce a regenerated catalytic cracking catalyst, heat and carbon dioxide; and a recycle step comprising recycling the regenerated catalytic cracking catalyst to the catalytic cracking step. The catalytic cracking step is preferably carried out as described herein before. As explained hereinabove, in one embodiment, there is provided a fluid catalytic cracking process, wherein in step e), the feed mixture is contacted with a fluid catalytic cracking catalyst in a fluid catalytic cracking reactor.

The separation step is preferably carried out with the help of one or more cyclone separators and/or one or more swirl tubes. In addition the separation step may further comprise a stripping step. In such a stripping step the spent catalytic cracking catalyst may be stripped to recover the products absorbed on the spent catalytic cracking catalyst before the regeneration step. These products may be recycled and added to the cracked product stream obtained from the catalytic cracking step.

The regeneration step preferably comprises contacting the spent catalytic cracking catalyst with an oxygen containing gas in a regenerator at a temperature of equal to or more than 550° C. to produce a regenerated catalytic cracking catalyst, heat and carbon dioxide. During the regeneration, coke that can be deposited on the catalyst as a result of the catalytic cracking reaction is burned off to restore the catalyst activity. The heat produced in the exothermic regeneration step is preferably employed to provide energy for the endothermic catalytic cracking step. In addition the heat produced can be used to heat water and/or generate steam. The steam may be used elsewhere in the refinery, for example as a liftgas in the riser reactor. In a preferred embodiment the heat produced in the exothermic catalytic cracking step may further be used to preheat the hydrocarbon feed in step b) or to preheat the pyrolysis oil. Preferably, the spent catalytic cracking catalyst is regenerated at a temperature in the range from equal to or more than 575° C., more preferably from equal to or more than 600° C., to equal to or less than 950° C., more preferably to equal to or less than 850° C. Preferably the spent catalytic cracking catalyst is regenerated at a pressure in the range from equal to or more than 0.05 MegPascal to equal to or less than 1.0 MegaPascal, more preferably from equal to or more than 0.1 MegaPascal to equal to or less than 0.6 MegaPascal.

The regenerated catalytic cracking catalyst may be recycled to the catalytic cracking step. In a preferred embodiment a side stream of make-up catalyst is added to the recycle stream to make-up for loss of catalyst in the reaction zone and regenerator.

In the process according to the invention a product stream containing one or more cracked products is produced. In a preferred embodiment, this product stream is subsequently fractionated to produce one or more product fractions. The one or more product fraction(s) may advantageously be used as biofuel component and/or biochemical component.

Alternatively, the one or more product fraction(s) may be upgraded in one or more further hydrocarbon conversion steps. Examples of such one or more hydrocarbon conversion steps include hydrodeoxygenation steps, hydrodesulphurization steps, hydroisomerization steps and combinations thereof. The upgraded product fraction(s) may hereafter be used as biofuel component and/or biochemical component.

The biofuel component and/or a biochemical component may advantageously be blended with one or more other components to prepare a biofuel and/or a biochemical. Examples of one or more other components with which the biofuel component and/or a biochemical component may be blended include anti-oxidants, corrosion inhibitors, ashless detergents, dehazers, dyes, lubricity improvers and/or mineral fuel components. By a biofuel respectively a biochemical is herein understood a fuel or a chemical that is at least partly derived from a renewable energy source.

In FIG. 1, one embodiment according to the invention is illustrated. In FIG. 1, hydrocarbon feed 102 containing a vacuum gas oil and a vacuum residue derived from petroleum crude oil is preheated in heat exchanger 104 to generate preheated hydrocarbon feed 106. Pyrolysis oil derived from a lignocellulosic material 108 is contacted with hydrogen stream 110 in hydrodeoxygenation reactor 112 containing hydrodeoxygenation catalyst 114 to produce at least partially hydrodeoxygenated pyrolysis oil 116. Preheated hydrocarbon feed 106 and at least partially hydrodeoxygenated pyrolysis oil 116 are blended together in in-line mixer 118 to produce feed mixture 120. Feed mixture 120 is subsequently atomized in bottom feed nozzle 122 located in riser reactor 124 to produce atomized feed mixture 126. Atomized feed mixture 126 and steam 128, which is used as liftgas, are supplied to riser reactor 124 via feed nozzle 122 where atomized feed mixture 126 is contacted with catalytic cracking catalyst 130 at a temperature of 520° C. to produce product stream 132 containing one or more cracked products.

Figure 2:
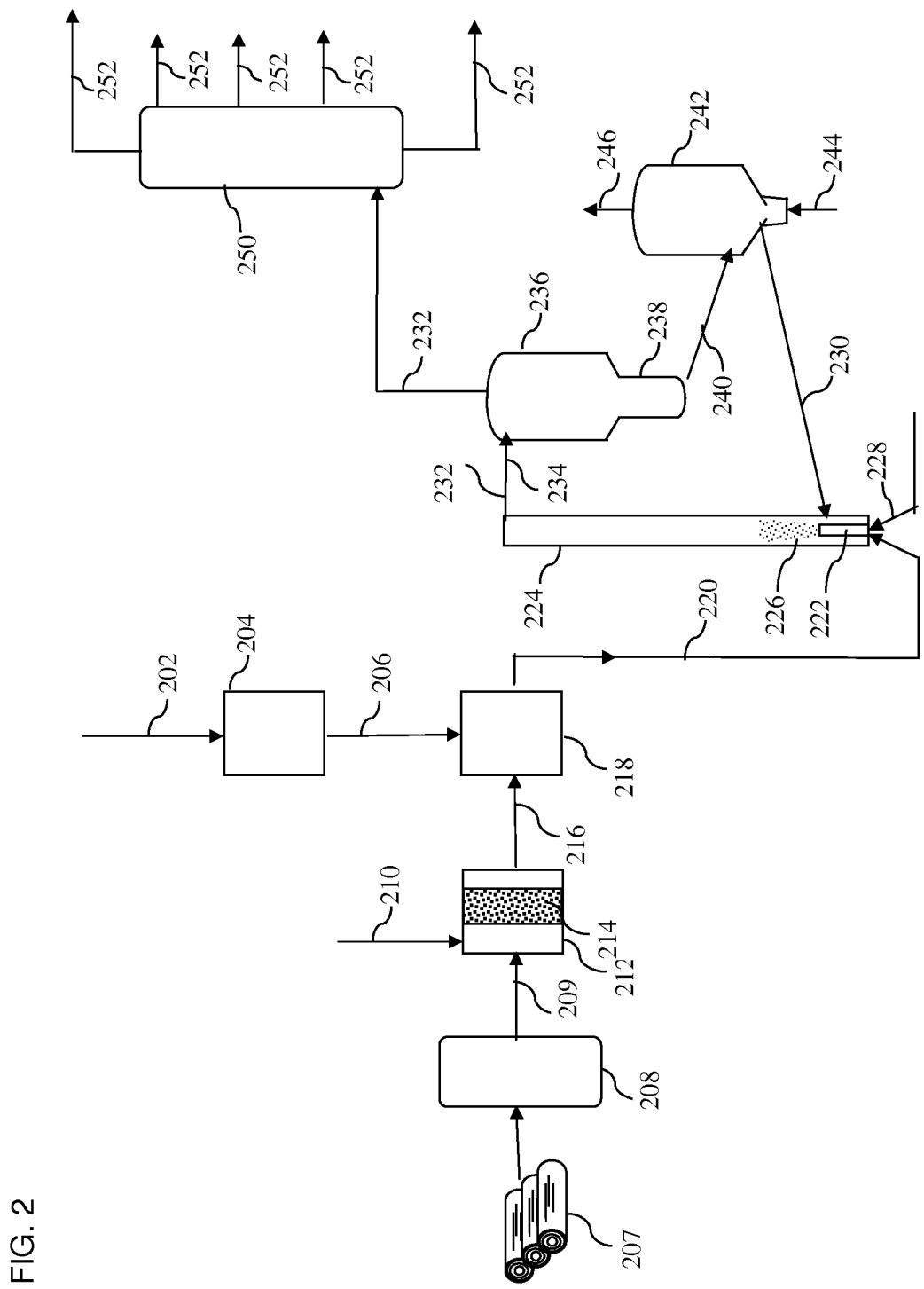
FIG. 2 shows a schematic diagram of a second process according to aspects of the invention.

In FIG. 2, a second embodiment according to the invention is illustrated. In FIG. 2, hydrocarbon feed 202 containing a vacuum gas oil and a vacuum residue derived from a petroleum crude oil is preheated in heat exchanger 204 to generate preheated hydrocarbon feed 206. As shown, lignocellulosic material 207 is pyrolysed in pyrolysis unit 208 to produce pyrolysis oil 209. Pyrolysis oil 209 is contacted with hydrogen stream 210 in hydrodeoxygenation reactor 212 containing hydrodeoxygenation catalyst 214 to produce at least partially hydrodeoxygenated pyrolysis oil 216. Preheated hydrocarbon feed 206 and at least partially hydrodeoxygenated pyrolysis oil 216 are blended together in in-line mixer 218 to produce feed mixture 220.

Feed mixture 220 is subsequently atomized in bottom feed nozzle 222 located in riser reactor 224 to produce atomized feed mixture 226. Atomized feed mixture 226 and steam 228, used as liftgas, are supplied to riser reactor 224 via feed nozzle 222, where atomized feed mixture 226 is contacted with regenerated catalytic cracking catalyst 230 at a temperature of 520° C. to produce gaseous product stream 232 containing one or more cracked products. Product stream 232 is forwarded together with spent catalytic cracking catalyst 234 to separator 236 containing multiple cyclones (not shown) to separate gaseous product stream 232 from spent catalytic cracking catalyst 234. Spent catalytic cracking catalyst 234 is subsequently stripped in stripping section 238 of separator 236. Hereafter, stripped spent catalytic cracking catalyst 240 is forwarded to regenerator 242 where it is regenerated with oxygen stream 244 at a temperature of 700° C. to provide gases 246 comprising carbon dioxide and/or carbon monoxide and regenerated catalytic cracking catalyst that can be recycled to the riser reactor as part of catalytic cracking catalyst stream 230.

Leaving separator 236, product stream 232 is forwarded to separation unit 250, where gaseous product stream 232 may be cooled and separated into one or more product fractions 252. These one or more product fractions 252 can advantageously be used for the conversion into one or more biofuel components and/or biochemical components. The invention is further illustrated by the following non-limiting examples.

COMPARATIVE EXAMPLE A

Figure 3:
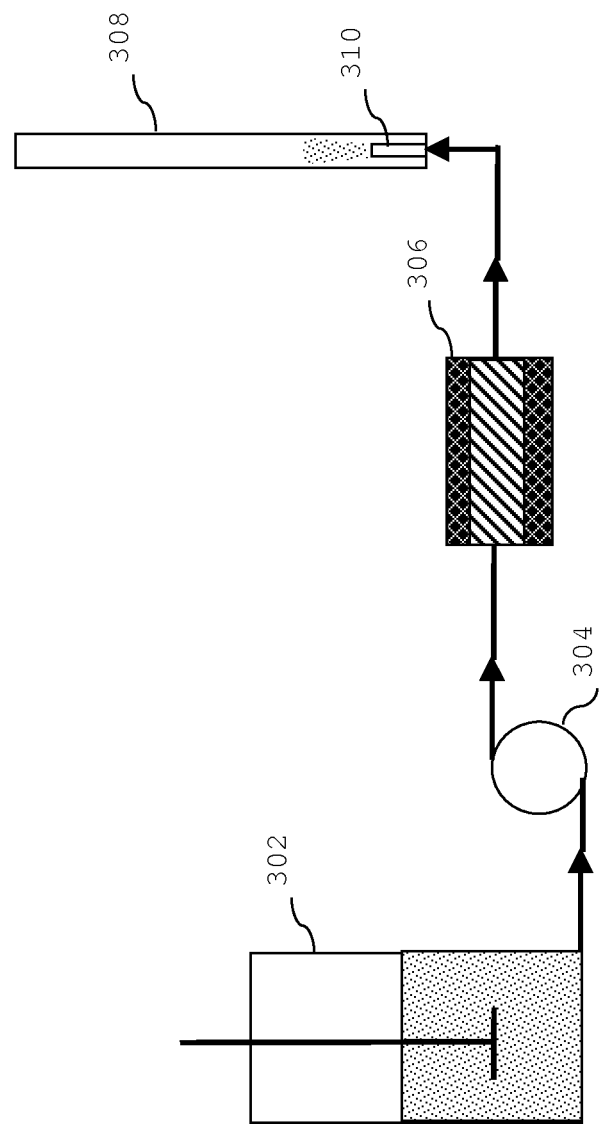
FIG. 3 shows a schematic diagram of comparative example A.

In comparative example A as illustrated in FIG. 3, a hydrocarbon feed containing 85 weight parts of a petroleum derived vacuum gas oil and 10 weight parts of a petroleum derived vacuum residue ("short residue") was mixed in mixing vessel 302 with 5 weight parts of a partially deoxygenated pyrolysis oil derived from a biomass material to prepare a feed mixture. Subsequently, this feed mixture was continuously pumped via pump 304 to heated furnace 306 at a rate of 2.0 kilogram/hour. The feed mixture was preheated in heated furnace 306 to a temperature of about 120° C., a temperature of about 150° C., and a temperature of about 200° C. respectively. Hereafter the preheated feed mixture was forwarded to fluid catalytic cracking reactor 308. In fluid catalytic cracking reactor 308, the feed mixture was atomized via feed nozzle 310 and contacted with a fluid catalytic cracking catalyst at 520° C. For each of the heating temperatures, the coke formation in the heated furnace was examined visually. It was found that operation of this mixing method led to considerably coking in the feed-pipe to the nozzle (i.e. the pipe for feeding the feed mixture) for all temperatures.

EXAMPLE 1

Figure 4:
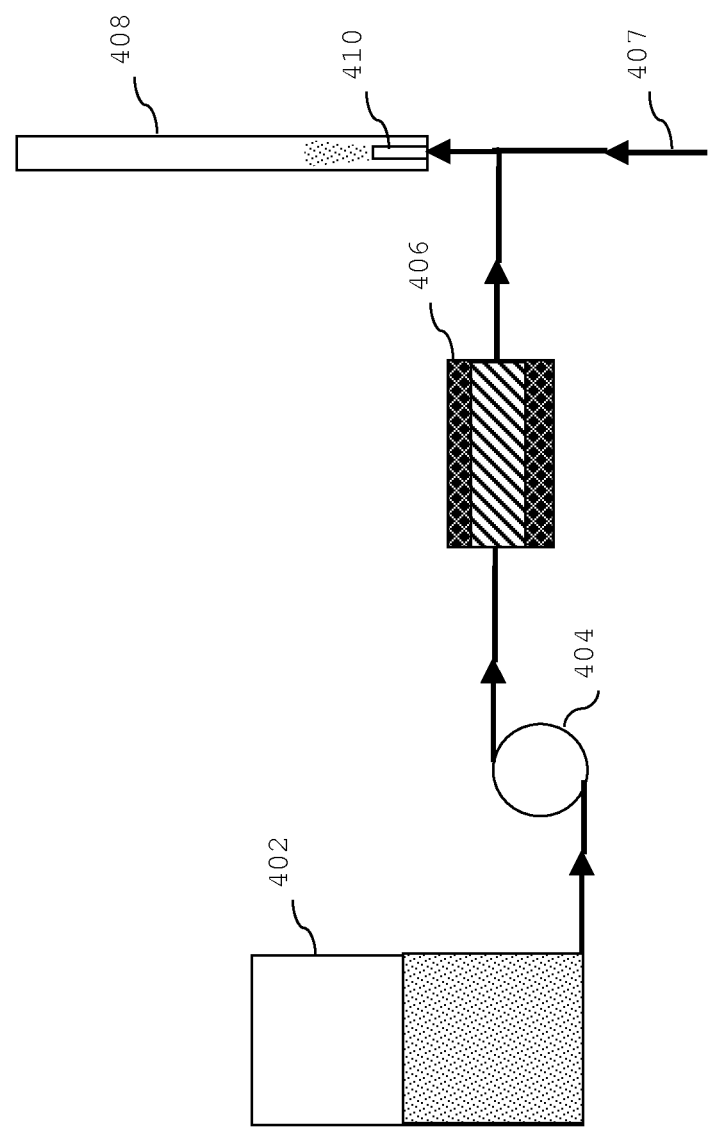
FIG. 4 shows a schematic diagram of example 1.

In example 1 as illustrated in FIG. 4, a hydrocarbon feed containing 85 weight parts of a petroleum derived vacuum gas oil and 10 weight parts of a petroleum derived vacuum residue ("short residue") was maintained at a temperature of about 80° C. in vessel 402. Subsequently, this hydrocarbon feed was continuously pumped via pump 404 to heated furnace 406 at a rate of 1.9 kilogram/hour. The hydrocarbon feed was preheated in the heated furnace 406 to a temperature of about 120° C., a temperature of about 150° C., and a temperature of about 200° C. respectively. Subsequently, the preheated hydrocarbon feed was mixed with 5 weight parts of partially deoxygenated pyrolysis oil 407 derived from a biomass material and preheated to 40° C. to prepare a feed mixture. The partially deoxygenated pyrolysis oil was supplied at a rate of 0.1 kilogram/hour. Hereafter the feed mixture was forwarded to fluid catalytic cracking reactor 408. In fluid catalytic cracking reactor 408, the feed mixture was atomized via feed nozzle 410 and contacted with a fluid catalytic cracking catalyst at 520° C.

For each of the temperatures the coke formation was examined visually. It was found that operation of this mixing method led to reduced coking. Whilst for a temperature of about 200° C. and a temperature of about 150° C. coking in the feed-pipe to the nozzle (i.e. the pipe for feeding the feed mixture) was still observed, a temperature of about 120° C. let to a low amount to no coking in the feed-pipe.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

The invention claimed is:

1. A process for catalytic cracking of a pyrolysis oil, said process comprises
    contacting a feed comprising a pyrolysis oil with hydrogen and a hydrodeoxygenation catalyst to produce an at least partially deoxygenated pyrolysis oil, wherein the pyrolysis oil is derived from material comprising cellulose and/or lignocellulose;
    heating a hydrocarbon feed to a temperature in the range from equal to or more than 50° C. to equal to or less than 200° C. to produce a preheated hydrocarbon feed;
    mixing the at least partially deoxygenated pyrolysis oil and the preheated hydrocarbon feed to produce a feed mixture; and
    contacting the feed mixture with a fluid catalytic cracking catalyst in a catalytic cracking reactor at a temperature of at least 400° C. to produce a product stream containing one or more cracked products.

2. The process of claim 1, further comprising atomizing the feed mixture prior to contacting the feed mixture with the fluid catalytic cracking catalyst.

3. The process of claim 2, wherein the atomizing step comprises atomizing the feed mixture in a feed nozzle.

4. The process of claim 3, wherein the feed nozzle is a bottom entry feed nozzle or side entry feed nozzle located in a riser reactor.

5. The process of claim 1, wherein the hydrocarbon feed comprises a petroleum derived hydrocarbon feed.

6. The process of claim 1, wherein the hydrocarbon feed is heated to a temperature of equal to or more than 60° C. and equal to or less than 140° C.

7. The process of claim 1, wherein the mixing step comprises mixing the at least partially deoxygenated pyrolysis oil and the preheated hydrocarbon feed in a feed nozzle.

8. The process of claim 7, wherein the feed nozzle is a bottom entry feed nozzle or side entry feed nozzle located in a riser reactor.

9. The process of claim 1, further comprising supplying the feed mixture to a riser reactor via one or more bottom entry nozzles and/or one or more side entry nozzle.

10. The process of claim 1, further comprising separating the product stream into one or more product fractions.

11. The process of claim 10, further comprising converting the one or more product fractions into one or more biofuel components and/or biochemical components.

* * * * *